US009181843B2

(12) United States Patent
Kim et al.

(10) Patent No.: US 9,181,843 B2
(45) Date of Patent: Nov. 10, 2015

(54) ON-BOARD DIAGNOSTIC METHOD FOR NO₂ FORMATION IN AN OXIDATION CATALYST

(75) Inventors: Chang H. Kim, Rochester, MI (US); Janean E. Kowalkowski, Northville, MI (US); David N. Belton, Birmingham, MI (US); Steven J. Schmieg, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 152 days.

(21) Appl. No.: 13/561,127

(22) Filed: Jul. 30, 2012

(65) Prior Publication Data

US 2013/0074477 A1 Mar. 28, 2013

Related U.S. Application Data

(60) Provisional application No. 61/538,975, filed on Sep. 26, 2011.

(51) Int. Cl.
*F01N 3/00* (2006.01)
*F01N 3/02* (2006.01)
*F01N 3/10* (2006.01)
*F01N 3/20* (2006.01)
*F01N 11/00* (2006.01)

(52) U.S. Cl.
CPC .............. *F01N 11/002* (2013.01); *F01N 3/103* (2013.01); *F01N 2550/02* (2013.01); *F01N 2560/026* (2013.01); *F01N 2560/06* (2013.01); *F01N 2560/14* (2013.01); *F01N 2900/1602* (2013.01); *F01N 2900/1614* (2013.01); *Y02T 10/47* (2013.01)

(58) Field of Classification Search
USPC ............................ 60/274, 277, 286, 295, 299
See application file for complete search history.

(56) References Cited

U.S. PATENT DOCUMENTS

| | | | |
|---|---|---|---|
| 7,975,538 B2 | 7/2011 | In | |
| 8,327,621 B2 | 12/2012 | LaRose, Jr. et al. | |
| 8,549,836 B2 | 10/2013 | Maus et al. | |
| 2011/0126517 A1* | 6/2011 | Miyoshi et al. | 60/274 |
| 2012/0028788 A1 | 2/2012 | Manoylova et al. | |

FOREIGN PATENT DOCUMENTS

| | | |
|---|---|---|
| DE | 102009046433 A1 | 5/2011 |
| GB | 2470391 A | 11/2010 |
| WO | WO 2010/010448 * | 1/2010 |

OTHER PUBLICATIONS

OBD II Regulation; §1968.2 Malfunction and Diagnostic System Requirements—2004 and Subsequent Model-Year Passenger Cars, Light-Duty Trucks, and Medium-Duty Vehicles and Engines.

* cited by examiner

*Primary Examiner* — Audrey K Bradley
*Assistant Examiner* — Dapinder Singh
(74) *Attorney, Agent, or Firm* — Reising Ethington P.C.

(57) ABSTRACT

The capacity of a platinum-containing diesel oxidation catalyst (DOC) to simultaneously convert NO to $NO_2$, CO to carbon dioxide, and remaining hydrocarbons to carbon dioxide and water in the exhaust system of a vehicle diesel engine may be evaluated and diagnosed using measured DOC exhaust inlet temperatures and outlet temperatures at a relatively high exhaust temperature and, soon thereafter, at a relatively low exhaust inlet temperature. Values of the platinum-containing DOC exotherms at the high and low DOC inlet temperatures are found to provide a basis for evaluation of both NO conversion and the HC and CO conversion capabilities of the DOC. The process may be repeated as the catalyzed DOC conversion efficiency changes with use. The practice may also be used to evaluate the performance of oxidation catalysts used in a like way in treating the exhaust from a lean-burn gasoline engine.

12 Claims, 3 Drawing Sheets

ON-BOARD DIAGNOSTIC METHOD FOR NO₂ FORMATION IN AN OXIDATION CATALYST

This application claims priority based on provisional application 61/538,975, titled On-Board Diagnostic Method for NO$_2$ formation in a Diesel Oxidation Catalyst, filed Sep. 26, 2011, and which is incorporated herein by reference.

TECHNICAL FIELD

This disclosure pertains to performance assessment of catalyst-containing reactors and systems used for treatment of the exhaust gas stream from a diesel engine or a lean-burn gasoline engine of an automotive vehicle. More particularly, this invention pertains to the evaluation of the performance of a platinum-containing or platinum and palladium-containing diesel oxidation catalysts (sometimes called "DOC") used to oxidize carbon monoxide and hydrocarbons in the exhaust gas stream and to convert some of the nitrogen oxide (NO) to nitrogen dioxide (NO$_2$). References to diesel oxidation catalysts in this text are intended to include, when applicable, like oxidation catalysts used to treat the exhaust of a lean-burn gasoline engine.

BACKGROUND OF THE INVENTION

The statements in this section are intended to provide background information related to the present disclosure and may not constitute prior art.

Many vehicles are powered by multi-cylinder, reciprocating piston, diesel engines which use a hydrocarbon fuel (or a bio-diesel fuel mixture) that, when mixed with air, is ignited during high compression of the air-fuel mixture in each cylinder. In the operation of diesel engines (and lean-burn gasoline engines) the mass ratio of air to fuel (e.g., 17:1 or greater) is well above the stoichiometric air-to-fuel ratio. A turbocharger may be used to deliver air into the intake manifold of the engine and fuel injectors are used to deliver controlled amounts of fuel to each cylinder. Many parameters of engine operation are controlled using a computer-based engine control module. The result of such well-managed delivery of fuel and excess air to each cylinder is that efficient usage of the fuel is attained. But the exhaust gas stream, combined from the exhaust of the respective cylinders in the exhaust manifold of the engine, contains significant amounts of carbon monoxide (CO), incompletely burned hydrocarbons (HC), mixtures of oxides of nitrogen (mainly NO, with some NO$_2$, collectively NOx), and small particles of carbon, in addition to nitrogen, oxygen, carbon dioxide, and water.

Governmental regulations in the United States and other countries compel treatment of the exhaust streams from diesel engines on vehicles to reduce the quantity of each of CO, HC, NOx, and diesel particulates (micrometer size carbon particles) before the exhaust is discharged from the tailpipe of the vehicle. Thus, there is a need to design and place suitable reactors in the exhaust flow stream for conversion of these exhaust constituents to nitrogen, carbon dioxide and water before the treated exhaust is discharged from the exhaust system. Various catalyzed oxidation reactors and catalyzed reduction reactors are proposed for such exhaust treatment, and there is a corresponding need to assess the operation of such catalyzed reactors on each vehicle to determine whether they are functioning as required. There is a specific, government-mandated, need to determine whether a platinum-containing metal catalyzed DOC is functioning to suitably convert (oxidize) some nitrogen oxide, NO, to nitrogen dioxide, NO$_2$, so that the exhaust gas composition will respond to a selective catalytic reduction reactor in converting NOx to N$_2$ and water. The conversion of some NO to NO$_2$ is important to removing NOx from the exhaust stream.

SUMMARY OF THE INVENTION

The diagnostic method of this invention may be used in connection with an exhaust gas treatment system for a diesel engine when the treatment system includes a combination of a diesel oxidation catalyst (DOC) comprising platinum and palladium as metal; a selective catalytic reduction device (SCR); and a system for filtration of diesel carbon particulates, temporary storage of the filtered particulates, and periodic burning of the stored particles, each before the exhaust gas is discharged from the exhaust system. The exhaust gas leaving the exhaust manifold of a warmed-up diesel engine typically has a temperature up to about 200° C., but the temperature varies (or may be varied) during different stages or modes of engine operation. The hot oxygen-containing exhaust is typically conducted through sections of stainless steel pipes or conduits, successively to and from the respective exhaust treatment devices before the treated exhaust is discharged from the vehicle.

The DOC is often formed of an extruded cordierite monolith, generally cylindrical or elliptical in cross-section, with about 400 channels per square inch of cross-section extending from an exhaust inlet to an outlet of the flow-through monolithic body. The walls of the channels of the flow-through ceramic monolith carry wash-coated films of alumina particles which serve as supports for smaller particles of platinum (or platinum with some palladium) which serve as the catalyst for the DOC. The catalyst wash-coated monolith is typically confined in a stainless steel vessel which receives the exhaust stream from the exhaust manifold of the diesel engine, directs it through the channels of the catalyzed monolith, and releases the treated gas into an under-body conduit for subsequent downstream treatment. The DOC is sized and composed to allow the exhaust gas flowing through the catalyzed channels of the DOC to obtain substantial oxidation of carbon monoxide to carbon dioxide, substantial oxidation of unburned hydrocarbons to carbon dioxide and water, and oxidation of a portion of the nitrogen oxide, NO, to nitrogen dioxide, NO$_2$, in the exhaust gas stream as each portion flows through the reactor. While the catalyzed conversion of some NO to NO$_2$ does not reduce the NOx content, the increased NO$_2$ content facilitates downstream catalyzed reduction of NOx to nitrogen in a selective reduction reactor (SCR) or in a lean NOx trap (LNT).

A suitable temperature sensor is provided at the inlet and outlet of the DOC. NOx sensors may also be provided at the DOC inlet and SCR outlet, but NOx sensors do not measure NO conversion to NO$_2$ and thus do not differentiate between NO and NO$_2$. These temperature sensors are connected to a computer-based control system designed and constructed for management of the treatment of the successive treatment devices for the diesel exhaust stream. This exhaust treatment control system is suitably interconnected with the control system for the management of operation of the diesel engine. The management of air-to-fuel ratio, fuel injection timing, and many other engine operating parameters directly affect the composition and temperature of the exhaust gas, and are important in the operation of the oxidation, reduction, and particle removal systems for treating the exhaust.

This invention provides a method for diagnosis of the performance of a diesel oxidation catalyst, using platinum (or mixtures of platinum with palladium in an atomic ratio of about 5-10 atoms of Pt per atom of Pd) as the oxidation catalyst. In accordance with embodiments of the invention, the DOC inlet and outlet temperatures are sensed and compared under selected engine operating conditions. Initially, the diesel engine is operated to produce a higher than normal exhaust gas temperature at the inlet of the DOC. Where a normal inlet temperature may be, for example, about 200° C., the diesel engine is momentarily operated to produce an exhaust temperature at the DOC inlet that is considerably higher, for example, fifty degrees Celsius higher. This high temperature excursion may be accomplished by managing the engine to operate in a temporary fuel-rich mode so as to produce an exhaust temperature at the DOC inlet of, for example, about 250° C. The higher exhaust temperature may be utilized, for example, for removal of carbon particles from a downstream diesel particulate filter. But, importantly, the increased exhaust temperature is used in this invention in diagnosis of the operation of the DOC reactor. During the momentary operation of the engine at the higher temperature, the DOC inlet and DOC outlet temperatures are sensed and stored. In normal operation of the platinum-containing DOC where the platinum-containing particles are active, the outlet temperature of the DOC will be several degrees higher, twenty degrees Celsius higher or more, than the inlet temperature. This temperature increase is due principally to the exothermic oxidation of carbon monoxide and unburned hydrocarbons over the surface of the DOC catalyst elements.

Soon after the engine operation excursion to produce a relatively high exhaust temperature at the DOC inlet, normal engine operation is restored to produce a lower, more normal, DOC temperature inlet of for example, about 200° C. The intention is to have a DOC inlet temperature that is significantly lower (e.g., forty to fifty Celsius degrees lower) than the high temperature reading in this diagnostic test sequence. Again, the DOC inlet and outlet temperatures are sensed and stored.

The inventors herein recognize that the oxidations of CO and HC over platinum are greatly exothermic, while the oxidation of NO to $NO_2$ is not. And the inventors have assembled test data that enabled them to devise the combined use of relatively high and normal exhaust gas temperatures at the DOC inlet as a basis for determining whether the DOC is effectively converting NO to $NO_2$ in its reaction which does not, itself, produce an observable change in temperature as the exhaust is treated in the DOC.

The full diagnostic process will be more fully described in the following sections of this specification. But, in summary, when the DOC outlet temperature is not greater than the DOC inlet temperature at the higher exhaust temperature, the DOC is considered to have failed for each of CO, HC, and NO oxidation reactions. Where the $\Delta T$ is greater than zero at the high inlet temperature but equal to zero at the lower inlet temperature, it is concluded that the DOC has failed only with respect to NO oxidation under the selected range of inlet temperatures. And where the value of $\Delta T$ is zero at the lower DOC inlet temperature, it is concluded that the DOC is not functioning to oxidize NO to $NO_2$. But, importantly, where $\Delta T$ values suitably greater than zero are sensed at both exhaust temperature levels, the DOC is considered as performing satisfactorily during the current diagnosis process.

This diagnostic process is repeated at selected or set (predetermined) periods of engine operation during the life of the engine and exhaust system.

Another aspect of this disclosure and invention lies in the aging and testing of candidate platinum-palladium catalyst samples in order to establish exhaust gas testing parameters for the testing of the samples and the evaluation of their continued capacity to produce suitable oxidation of NO to $NO_2$.

Other objects and advantages will be apparent from a detailed description of preferred embodiments of the invention which follow in this specification.

BRIEF DESCRIPTION OF THE DRAWINGS

In FIG. 1, and the following FIGS. 2 and 3, the solid data line is for a fresh platinum catalyst (10 Pt:1 Pd). The dash-dot-dot data line is for a gas burner-aged (24 hours) platinum-palladium catalyst with 3% oxygen at 1000° C. The long dash data line is for a gas burner-aged (24 hours) platinum-palladium catalyst with 8% oxygen at 1000° C. The short dash data line is for a gas burner-aged (24 hours) platinum-palladium catalyst with 8% oxygen at 1050° C.

DESCRIPTION OF PREFERRED EMBODIMENTS

Figure 1:
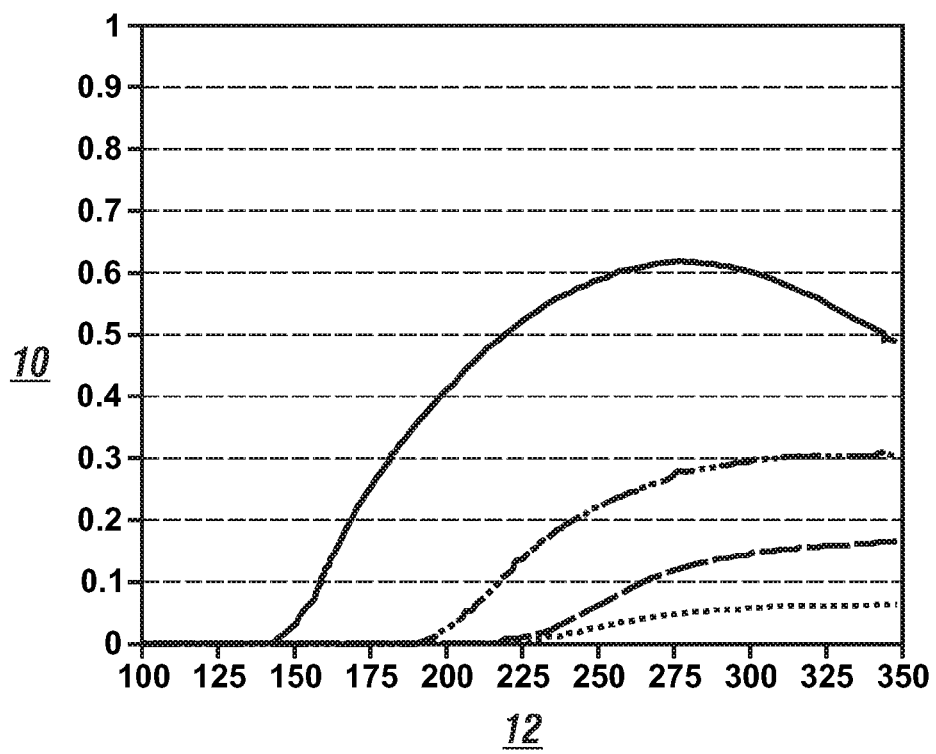
FIG. 1 is a graph of proportional conversion (from 0 to 1) of NO to $NO_2$ (axis 10) vs. Inlet Temperature (° C.) (axis 12) obtained in tests with a fresh platinum-containing DOC reactor and with three increasingly aged platinum-containing DOC reactors.

It is contemplated that practices of the diagnostic invention of this invention will be practiced in connection with a diesel engine and exhaust system where the exhaust system includes, in exhaust flow sequence, a platinum-catalyzed DOC, an injector for diesel exhaust fluid (for example, an aqueous solution of urea), a selective catalytic reduction reactor (SCR) and a diesel particulate filter that requires regeneration, all before release of the exhaust to the atmosphere.

A series of tests were planned and conducted to measure the ability of platinum-containing catalysts as used in a diesel oxidation converter in the conversion of NO to $NO_2$, the conversion of CO to $CO_2$, and the conversion of a representative mixture of low molecular weight hydrocarbons to carbon dioxide and water. The platinum-containing catalyst consisted of platinum metal (34 g/ft$^3$) and palladium metal (3 g/ft$^3$) deposited on alumina support particles. The alumina-supported, platinum-containing catalyst material was applied as a wash-coat material to the walls of channels formed in extruded and calcined cordierite monolith bodies. The cordierite bodies were round with a diameter of 0.75 inch and a length of 0.9 inch. This platinum-containing catalyst material was oven aged in air and 10% moisture for 96 hours at 600° C. in preparation for its use and may be considered a fresh DOC catalyst material.

It was desired to prepare samples of alumina particle-supported, platinum-containing catalysts that were aged; samples that had been exposed to oxygen-containing atmospheres at temperatures above diesel exhaust temperatures and above normal DOC operating temperatures. Exhaust gas streams from a gas burner respectively comprising, by volume, 10% $CO_2$, 10% water, 3% or 8% $O_2$ (as follows), and the balance nitrogen was used to age samples of platinum-palladium DOC catalyst specimens prepared on cordierite monoliths as described in the above paragraph. Groups of them were aged by using an accelerated aging method (periods of 24 hours in the hot gas burner exhaust stream). Sets of platinum-palladium catalyst samples were heated, respectively, in 3% $O_2$ at 1000° C., in 8% $O_2$ at 1000° C., in 8% $O_2$ at 1050° C., and in 8% $O_2$ at 1100° C. This practice of aging the platinum-based catalyst samples using a gas burner-generated, diesel-simulated exhaust with oxygen in the exhaust proved to be useful in developing a diagnostic process for the platinum-containing DOC reactor. Fresh platinum-palladium catalysts and such aged platinum-containing catalyst samples were then tested in a synthetic gas stream representative of diesel engine exhaust to measure their effectiveness in converting NO to $NO_2$, in converting CO to $CO_2$, in converting a mixture of propylene and propane (2:1 molar ratio as representative of unburned HC) to $CO_2$ and $H_2O$, and their correlation.

In evaluating the performance of a fresh platinum-containing DOC catalyst and various aged platinum-containing catalysts, gas streams consisting of, by volume, 200 ppm NO, 500 ppm CO, 1000 ppm (on $C_1$ basis) of the 2:1 $C_3H_6$:$C_3H_8$ mixture, 8% $CO_2$, 10% $O_2$, 5% $H_2O$, and the balance nitrogen were passed at temperatures gradually increasing (2° C./min) from 100° C. to 350° C. through the channels of the respective platinum/palladium on alumina wash-coated, extruded cordierite monoliths at GHSV of 30,000 h$^{-1}$. The inlet temperatures and the outlet temperatures of the fresh and aged catalyst monoliths were sensed and recorded over each test. The measured components in the exhaust were NO/$NO_2$/HC/CO/$CO_2$/$H_2O$.

Figure 2:
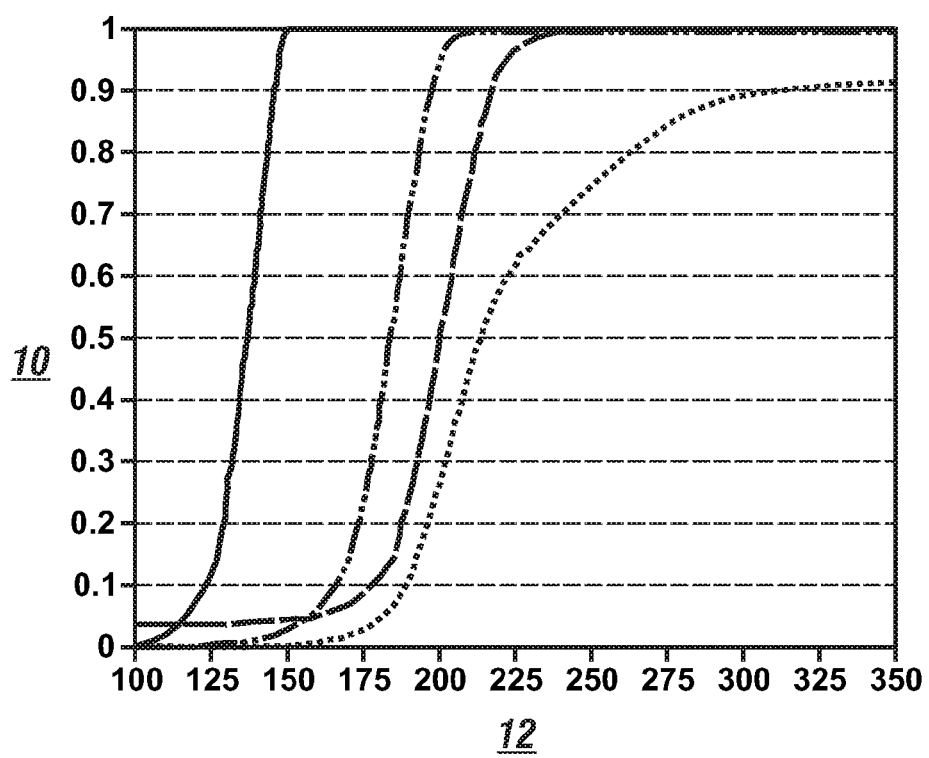
FIG. 2 is a graph of proportional conversion (from 0 to 1) of CO to $CO_2$ (axis 10) vs. Inlet Temperature (° C.) (axis 12) obtained in tests with a fresh platinum-containing (10 Pt:1 Pd) DOC reactor and with three increasingly gas burner exhaust aged platinum-palladium DOC reactors. The data lines for the fresh platinum-palladium catalyst and for the three gas burner aged Pt—Pd catalysts are as respectively indicated as in FIG. 1.
Figure 3:
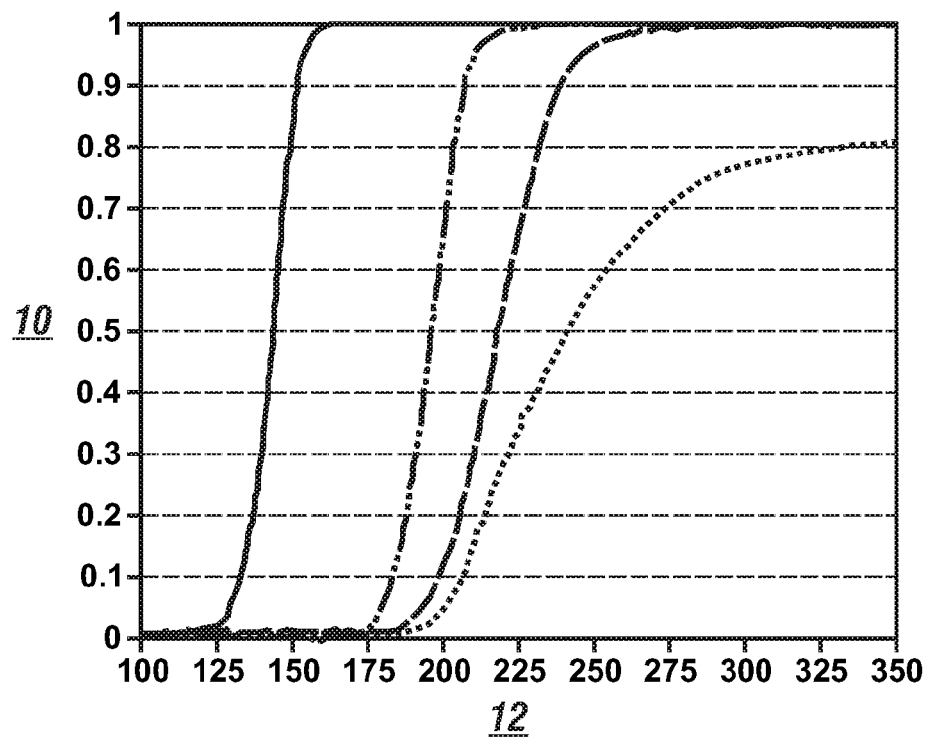
FIG. 3 is a graph of proportional conversion (from 0 to 1) of a mixture of propylene and propane (2:1) to carbon dioxide and water (axis 10) vs. Inlet Temperature (° C.) (axis 12) obtained in tests with a fresh platinum-palladium DOC reactor and with three increasingly gas burner aged platinum-palladium DOC reactors. The data lines for the fresh platinum-palladium catalyst and for the three gas burner aged Pt—Pd catalysts are as respectively indicated as in FIG. 1. The data lines for the fresh platinum-palladium catalyst and for the three gas burner aged Pt—Pd catalysts are as respectively indicated as in FIG. 1.
Figure 4:
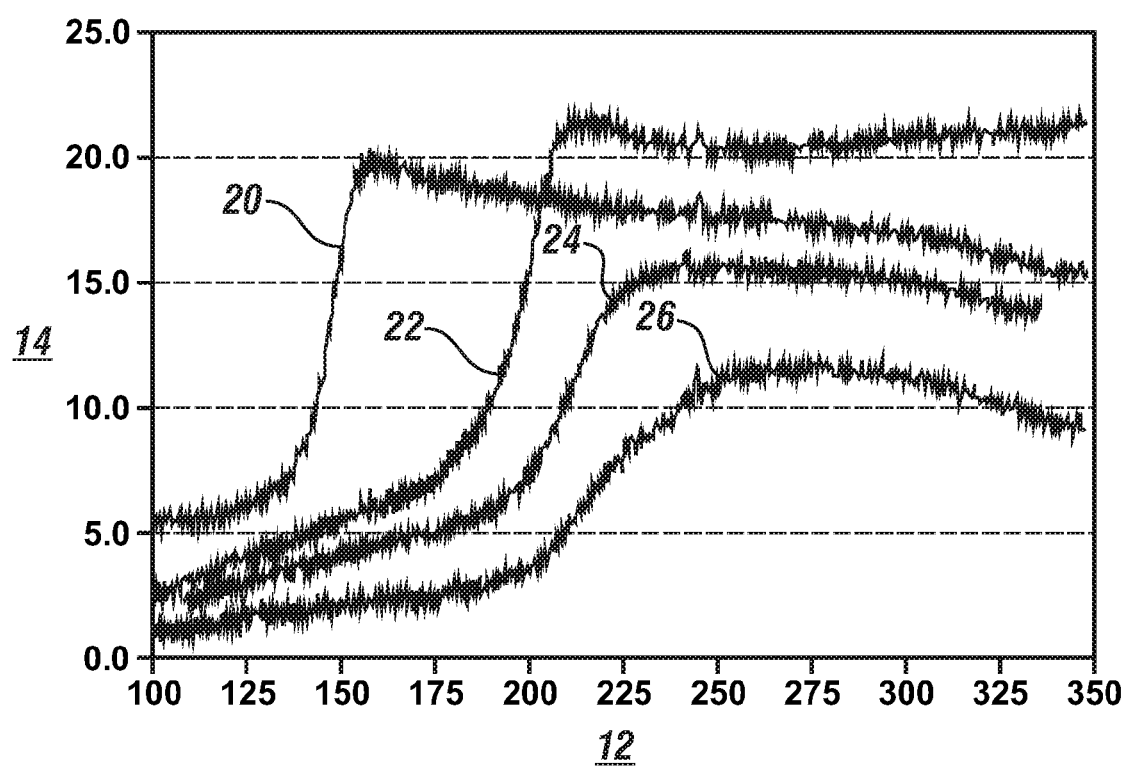
FIG. 4 is a graph of $T_{out}-T_{in}$ ($\Delta T$ in ° C.) (axis 14) vs. Inlet Temperature (° C.) (axis 12) for the respective tests of new and aged DOC reactors. The data line labeled 20 is for a fresh platinum-palladium catalyst (10 Pt:1 Pd). The data line labeled 22 is for a gas burner-aged (24 hours) platinum-palladium catalyst with 3% oxygen at 1000° C. The data line labeled 24 is for a gas burner-aged (24 hours) platinum-palladium catalyst with 8% oxygen at 1000° C. The data line labeled 26 is for a gas burner-aged (24 hours) platinum-palladium catalyst with 8% oxygen at 1050° C.

FIGS. 1-3 are graphs of proportion of conversion (from 0, no conversion, to 1, complete conversion) (axis 10 in each graph) of the respective constituents over inlet temperature ranges (axis 12 in each graph), as stated from 100° C. to 350° C., for the fresh platinum-containing DOC catalyst and three of the aged platinum-containing DOC catalysts. The conversion data for the fresh Pt—Pd samples is presented as solid lines in the Figures. The dash-dot-dot data line is for a gas burner-aged (24 hours) platinum-palladium catalyst with 3% oxygen at 1000° C. The long dash data line is for a gas burner-aged (24 hours) platinum-palladium catalyst with 8% oxygen at 1000° C. The short dash data line is for a gas burner-aged (24 hours) platinum-palladium catalyst with 8% oxygen at 1050° C. The Pt—Pd catalyst sample aged in 8% oxygen at 1100° C. was degraded to the extent that it could not be used to oxidize any of the constituents in the simulated exhaust gas. FIG. 4 is a graph of the outlet temperature minus the inlet temperature, i.e., the $\Delta T$ exotherm, (° C.) (axis 14) vs. the inlet temperature (° C.) (axis 12) for the fresh and three aged samples (data curves labeled, respectively, 20, 22, 24, and 26). The exotherm is solely generated from the oxidation of HC and CO, not from oxidation of NO.

As expected, it is seen in the respective graphs that the fresh platinum-containing DOC catalyst (solid data line) achieved increasing conversion of NO to $NO_2$ (FIG. 1) as the inlet temperature increased from about 140° C. to about 275° C., where it reached a conversion proportion of about 0.61. As the inlet temperature was increased from 275° C. to 350° C., the conversion proportion fell to about 0.5. The conversion of NO to $NO_2$ is a reversible, thermodynamic equilibrium process which results in lower $NO_2$ content at higher temperatures of their mixtures. In general, it is observed that $NO_2$ formation begins once HC conversion is greater than about 90%.

The aged platinum-containing DOC catalysts required higher inlet temperatures to achieve lower conversion of NO to $NO_2$. In FIGS. 1-3, data for the platinum-catalyzed DOC sample aged in 3% $O_2$ at 1000° C. is presented as the dash-dot-dot data lines. Data for the DOC sample aged in 8% $O_2$ at 1000° C. is presented as the long dash data lines. Data for the DOC sample aged in 8% $O_2$ at 1050° C. is presented as the short dash data lines. As is seen in FIG. 1, the sample aged at 1050° C. lost much of its performance for oxidation of NO. However, the same-aged Pt—Pd catalyst could still convert HC and CO to $CO_2$ and produce an exotherm.

The fresh platinum-containing DOC sample promoted complete conversions of CO and $C_3H_6$ at relatively low temperatures, typical diesel exhaust temperatures from about 125° C. to 225° C. The Pt samples aged at 1000° C. and the sample aged at 1050° C. displayed capability of CO and HC conversions: however the catalyst aged at 1050° C. showed conversion of NO to $NO_2$ below 10%, while the aged catalyst still produced an exotherm from the oxidation of CO and HC, and it is found that low HC and CO conversion leads to low exotherm, and un-reacted HC and CO reduce any formed $NO_2$ back to NO.

Based on studies and observed results as described in the above conversion tests and inlet and outlet temperature data, it is found that the $\Delta T$ data corresponds with the conversion data and may be used during managed diesel engine operation to assess and diagnose the performance of a platinum-containing DOC catalyst for $NO_2$ production during ongoing engine operation. The test results indicate that it is possible to use this diagnostic approach to monitor each of the three functions of the DOC.

Figure 5:
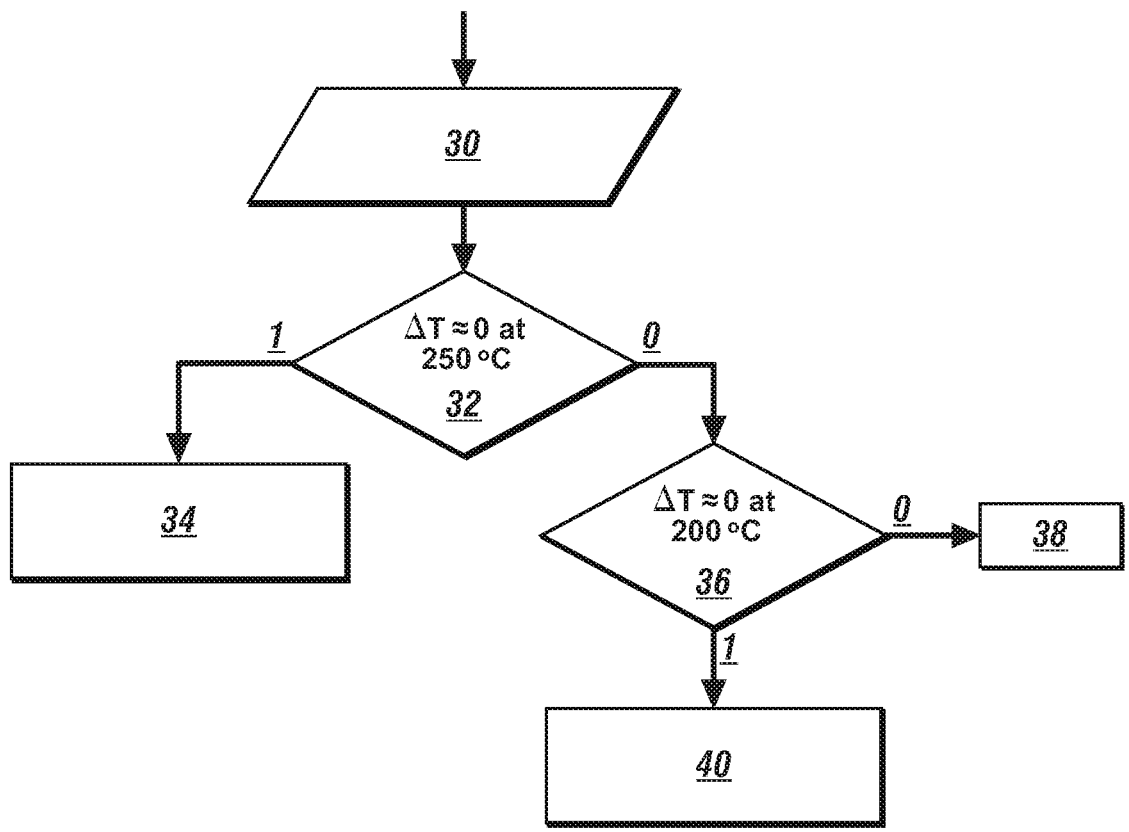
FIG. 5 is a flow chart of a diagnostic method for evaluating the performance of platinum-containing DOC reactors.

Reference is made to FIG. 5, a flow diagram to illustrate a suitable method of using inlet and outlet temperatures to a platinum-containing DOC in the exhaust system of a vehicle diesel engine to provide an efficient and reliable method of assessing its current capacity to convert NO to $NO_2$ as it also is serving to convert CO and unburned hydrocarbon constituents. The method may be used to consider separately the present capacity of the DOC to convert CO and HC. Even though the exhaust system may employ NOx sensors at the inlet and outlet of the DOC, these sensors alone do not directly reflect conversion of NO to $NO_2$ in the DOC.

In the method of FIG. 5, the diagnostic procedure starts with the engine and/or exhaust computer-based control modules commencing to sense and store values for the inlet temperature ($T_{DOC\ in}$) and outlet temperatures ($T_{DOC\ out}$) of the DOC. In FIG. 5, these data are entered in data input box 30. At this time, the diesel engine control system is operating the engine to produce a predetermined, relatively high temperature exhaust gas, so the exhaust gas is relatively hot (e.g. about 250° C.) as it enters the DOC reactor. A value for the ΔT (exotherm) produced by the DOC reactor operation is calculated from the $T_{DOC\,in}$ value and $T_{DOC\,out}$ value at this selected relatively high temperature (inquiry box 32). If the value of ΔT is zero or close to zero (inquiry answered as yes or "1" at 32-1), the DOC is failing to perform both its HC and CO conversion functions and it's NO conversion function. This conclusion of complete failure of the DOC with respect to each of its HC, CO, and NO conversion functions is indicated in conclusion box 34. None of the oxidation reactions are proceeding as required. The computer based control system provides a Notice (such as on an instrument panel screen, or the like) to the vehicle operator of the failure of the vehicle's DOC.

If the value of ΔT at this relatively high exhaust gas temperature is not zero (i.e., ΔT is greater than zero) (i.e., the answer in query box 32 is "no" or "zero" at 32-0, a suitable time (e.g., a period of minutes) is permitted to pass until the temperature of the exhaust gas at the DOC inlet has fallen to a lower (and probably more normal) temperature. For example, the inlet temperature is caused or allowed to fall about fifty Celsius degrees to about 200° C. DOC inlet and outlet temperatures are again sensed (from data box 30) and stored and a value of ΔT determined at this lower exhaust temperature (query box 36). If the value of ΔT is not zero (greater than zero, reflected as "no" or "0" at 36-0) at this lower exhaust temperature, the DOC reactor is considered as operating successfully and no notice is required. This conclusion is reflected in conclusion box 38 and such notice may be made available in the vehicle exhaust management system and to the vehicle operator. But if the value of ΔT is now zero ("yes" or "1" at 36-1), the NO conversion function of the DOC reactor is considered to have failed (result indicated in conclusion box 40) and such notice is given to the vehicle operator. The CO and HC oxidation functions are considered acceptable.

It is seen that this NO conversion evaluation also serves as an evaluation of HC conversion and CO conversion. The process relies on values of ΔT for the DOC exotherm being obtained at a relatively DOC high exhaust inlet temperature and significantly lower DOC inlet temperature. This requirement is based on operating data as described above which reflects the fact that both exothermic and non-exothermic reactions occur in a functioning DOC. Inlet values of 250° C. and 200° C. are considered preferred, but different high and low values may be chosen and a suitable temperature difference may be used. For example, in establishing a test regime of a suitable high and low DOC inlet temperatures, constituent conversion tests with representative exhaust gas compositions (as described above in this specification) may be conducted on selectively aged samples of a candidate Pt catalyst or Pt/Pd catalyst. Conversion data and ΔT data is acquired, like that presented in FIGS. 1-4 of this specification. ΔT data like that presented in FIG. 4 will provide a basis for selecting testing temperatures for a DOC. The data presented in FIG. 4 suggests that a higher DOC inlet temperature of 250° C. for samples of the selected and aged Pt/Pd catalyst is suitable, as is a temperature of about 200° C. for the lower inlet testing temperature.

Such testing may be conducted on each candidate platinum-based catalyst being qualified for use in a DOC converter for a diesel exhaust system. In other words, the above-described testing procedure (or a suitable like procedure) is devised to test aged platinum based catalysts for the purpose of selecting a relatively high DOC inlet exhaust temperature and a relatively low DOC inlet exhaust temperature for an engine and exhaust catalyst combination.

The described embodiments of the invention are intended to illustrate practices of the invention, but not to limit their scope.

The invention claimed is:

1. A method of oxidizing nitrogen oxide, carbon monoxide, and unburned hydrocarbons in an exhaust stream of a vehicle diesel engine using a platinum-containing diesel oxidation catalyst (DOC) where the DOC is intended to simultaneously convert nitrogen monoxide (NO) to nitrogen dioxide ($NO_2$), carbon monoxide to carbon dioxide, and unburned hydrocarbons to carbon dioxide and water, the method comprising:

flowing the exhaust stream from an exhaust manifold of the vehicle diesel engine through channels in an extruded ceramic monolith, the channels extending from an inlet to an outlet of the ceramic monolith and having channel walls carrying wash-coated films of particles of the platinum-containing diesel oxidation catalyst and oxidizing nitrogen oxide, carbon monoxide, and unburned hydrocarbons in the exhaust stream, the exhaust stream passing in contact with a temperature sensor at the inlet of the DOC coated channels and a temperature sensor at the outlet of the DOC coated channels, the inlet temperature sensor and the outlet temperature sensor being connected with a computer-based control system programmed for performance of this method; the method further comprising using the computer-based control system, while the exhaust stream is flowing through the DOC coated channels for oxidation of the nitrogen oxide, carbon monoxide, and unburned hydrocarbons, in:

recording temperature values of the inlet temperature sensor and the outlet temperature sensor;

determining the value of a temperature difference (ΔT) between the recorded exhaust gas inlet temperature of the DOC and the recorded exhaust gas outlet temperature of the DOC at a relatively high exhaust gas inlet temperature, which ΔT value may have a zero or non-zero magnitude; and, during the same occasion of engine operation, determining the value of ΔT between the recorded exhaust gas inlet temperature and the recorded exhaust gas outlet temperature of the DOC at a lower exhaust gas inlet temperature, which ΔT value may have a zero or non-zero magnitude;

using the zero or non-zero magnitudes of the obtained values of ΔT as a measure of NO oxidation occurring in the DOC:

periodically, during different occasions of engine operation, repeating the recordings and determinations of DOC inlet temperature values and DOC outlet temperature values, and their use in measuring NO oxidation occurring in the DOC: and when a non-zero value of ΔT at the higher DOC exhaust gas inlet temperature value and a zero value at the lower DOC exhaust gas inlet temperature are obtained, providing a notice in the vehicle that the DOC is not oxidizing NO to $NO_2$.

2. A method as recited in claim 1 in which the relatively high exhaust gas DOC inlet temperature value is 250° C. and the lower exhaust gas DOC inlet temperature is at least twenty-five degrees Celsius lower.

3. A method as recited in claim 1 in which the lower DOC exhaust gas inlet value is 200° C. and the higher DOC inlet temperature is at least twenty-five degrees Celsius higher.

4. A method as recited in claim 1 in which the higher DOC inlet temperature value is forty to fifty Celsius degrees higher than the lower DOC inlet temperature.

5. A method as recited in claim 1 in which non-zero values of $\Delta T$ at both of the higher DOC exhaust gas inlet temperature value and the lower DOC exhaust gas inlet temperature value are used to indicate effective performance of the DOC with respect to each of NO conversion, CO conversion, and HC conversion.

6. A method as recited in claim 1 in which a zero value of $\Delta T$ at the higher DOC inlet temperature value is used to indicate ineffective performance of the DOC with respect to each of NO conversion, CO conversion, and HC conversion, and upon obtaining such a zero value of $\Delta T$, a notice is provided in the vehicle of the ineffective performance of the DOC with respect to each of NO conversion, CO conversion, and HC conversion.

7. A method of oxidizing nitrogen oxide, carbon monoxide, and unburned hydrocarbons present in an exhaust gas stream flowing from an exhaust manifold of a vehicle diesel engine into an exhaust conduit of the vehicle diesel engine using a platinum-based diesel oxidation catalyst, the platinum-based diesel oxidation catalyst being coupled to the exhaust manifold of the engine and employed to oxidize residual hydrocarbons to carbon dioxide and water, carbon monoxide to carbon dioxide, and NO to $NO_2$ in the exhaust gas stream from the vehicle diesel engine preparatory to the exhaust stream being subsequently subjected to selective catalytic reduction of NO and $NO_2$ and filtration and periodic burning of particulates in the exhaust gas stream, the method comprising:

passing the exhaust gas stream flowing in the exhaust conduit from the exhaust manifold into contact with the platinum-based catalyst comprising particles of platinum and palladium dispersed on alumina support particles in a diesel oxidation catalyst reactor vessel (DOC) with a DOC inlet and DOC outlet with respect to a flow of the exhaust gas stream to oxidize nitrogen oxide, carbon monoxide and unburned hydrocarbons, the exhaust conduit comprising a temperature sensor for measuring exhaust gas stream temperature at the DOC inlet and a temperature sensor for measuring the exhaust gas stream temperature at the DOC outlet, the platinum-based oxidation catalyst having a pre-determined composition with aging characteristics as predetermined by heating specimens of the platinum-based catalyst in a catalyst-aging gas stream comprising carbon dioxide, water, oxygen, and nitrogen at temperatures above a specified operating temperature of the DOC, the vehicle having a computer-based exhaust gas stream control system operable in combination with a diesel engine operation control system, the computer-based exhaust gas stream control system being programmed to receive, store, and compare engine exhaust gas stream temperatures at the DOC reactor vessel exhaust inlet and the DOC reactor vessel exhaust outlet and to perform the steps of this method; the method further comprising using the computer-based exhaust stream control system, while the exhaust gas stream is flowing through DOC reactor vessel for oxidation of nitrogen oxide, carbon monoxide, and unburned hydrocarbons, in:

recording temperature values of the DOC reactor vessel inlet temperature sensor and the DOC reactor vessel outlet temperature sensor;

periodically determining a value of the temperature difference ($\Delta T$) between an exhaust gas inlet temperature of the DOC and an exhaust gas outlet temperature of the DOC at a relatively high exhaust gas inlet temperature, which $\Delta T$ value may have a zero or non-zero magnitude, the high exhaust gas inlet temperature being determined by the catalyst aging characteristics process, the high exhaust temperature being attained by engine operation; and, during the same occasion of engine operation, determining the value of $\Delta T$ between the exhaust gas inlet temperature and the outlet temperature of the DOC at a lower exhaust gas inlet temperature, which $\Delta T$ value may have a zero or non-zero magnitude, the low exhaust gas temperature being determined by the catalyst aging characteristics process, the low exhaust temperature being attained by engine operation;

using the zero or non-zero magnitudes of the obtained values of $\Delta T$ as a measure of a current effectiveness of a NO oxidation function of the DOC, and recording such values of DOC of current NO oxidation effectiveness;

periodically, during different occasions of engine operation, repeating the DOC inlet temperature values and DOC outlet temperature values, and their use in measuring the effectiveness of the NO oxidation function of the DOC; and when a non-zero value of $\Delta T$ at the higher DOC exhaust gas inlet temperature value and a zero value at the lower DOC exhaust gas inlet temperature are obtained, providing a notice in the vehicle that the DOC is not satisfying its intended function of oxidizing NO to $NO_2$.

8. A method as recited in claim 7 in which the relatively high exhaust gas DOC inlet temperature value is 250° C. and the lower exhaust gas DOC inlet temperature is at least twenty-five degrees Celsius lower.

9. A method as recited in claim 7 in which the lower DOC exhaust gas inlet value is 200° C. and the higher DOC inlet temperature is at least twenty-five degrees Celsius higher.

10. A method as recited in claim 7 in which the higher DOC inlet temperature value is forty to fifty Celsius degrees higher than the lower DOC inlet temperature.

11. A method as recited in claim 7 in which non-zero values of $\Delta T$ at both of the higher DOC exhaust gas inlet temperature value and the lower DOC exhaust gas inlet temperature value are used to indicate effective performance of the DOC with respect to each of NO conversion, CO conversion, and HC conversion.

12. A method as recited in claim 7 in which a zero value of $\Delta T$ at the higher DOC inlet temperature value is used to indicate ineffective performance of the DOC with respect to each of NO conversion, CO conversion, and HC conversion, and upon obtaining such a zero value of $\Delta T$, a notice is provided in the vehicle of the ineffective performance of the DOC with respect to each of NO conversion, CO conversion, and HC conversion.

* * * * *